Figure 3:
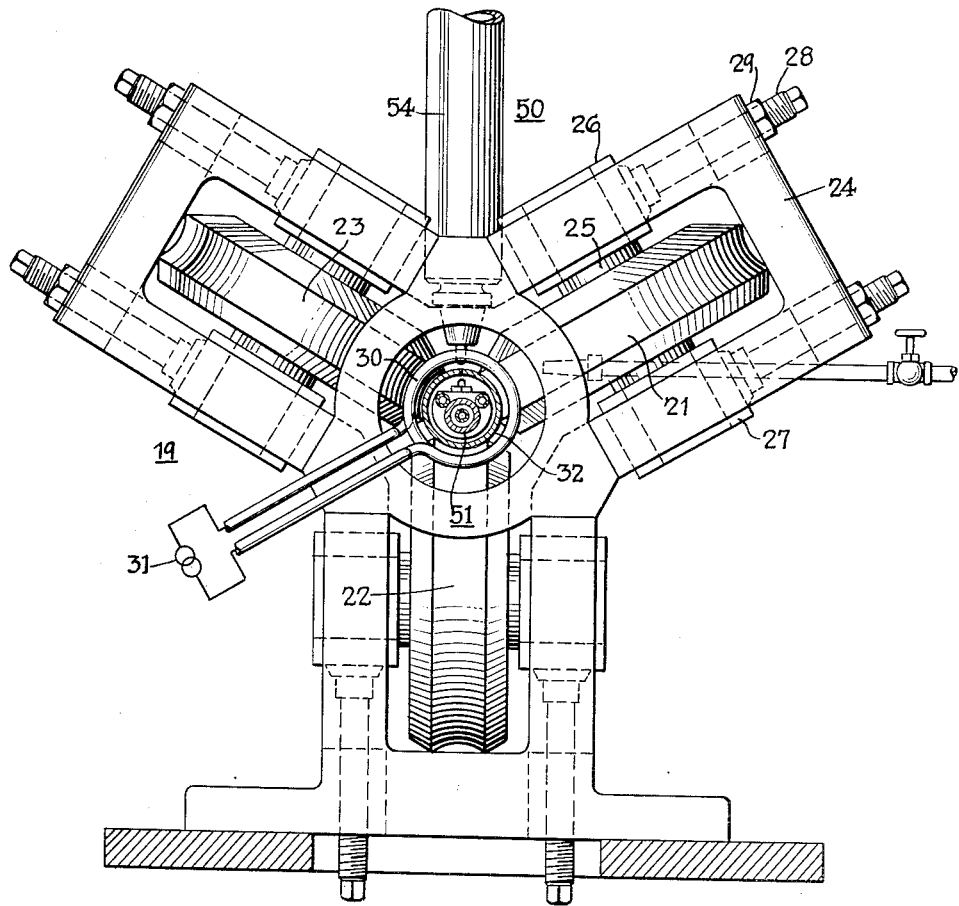

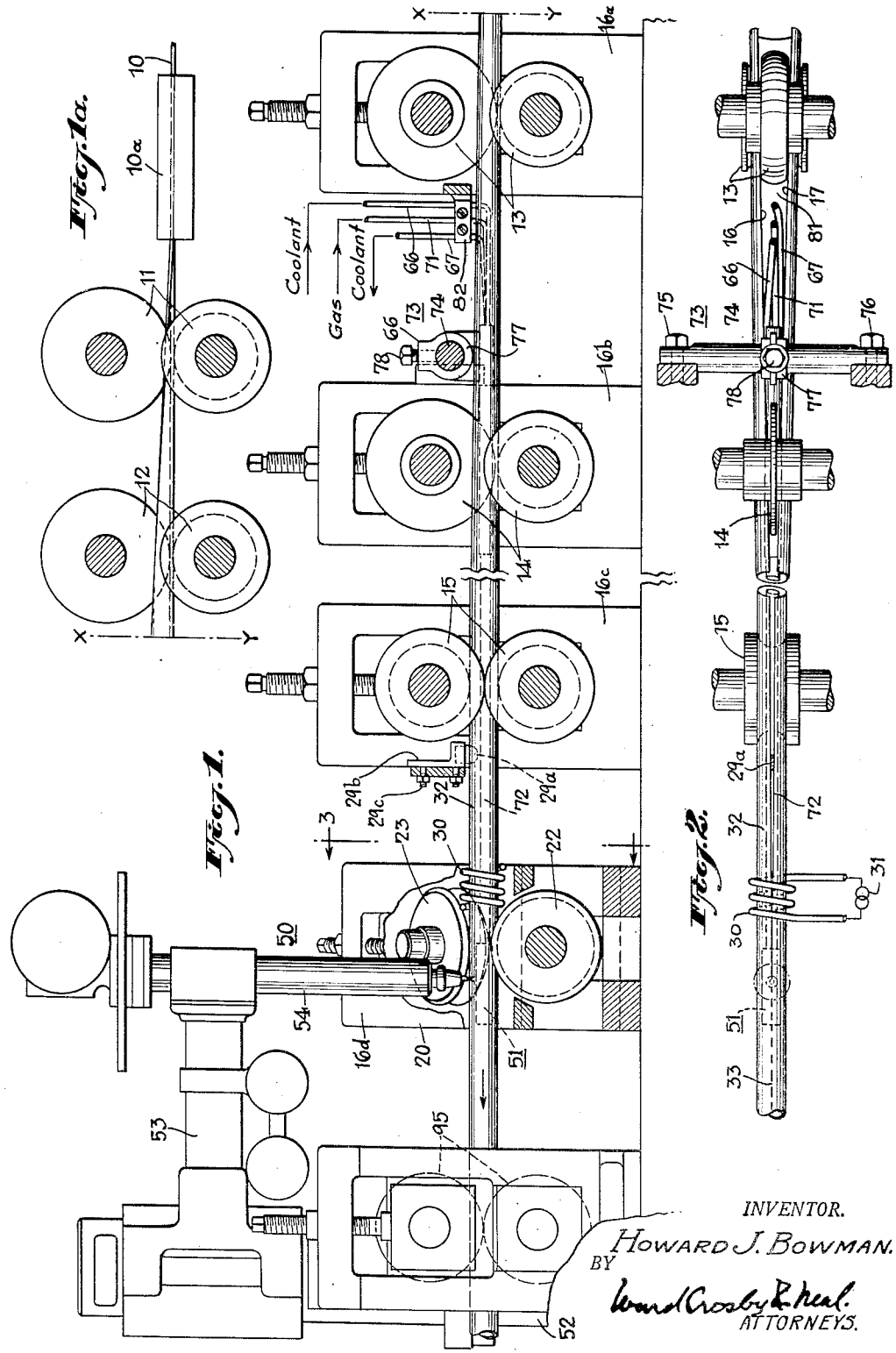

Feb. 16, 1954     H. J. BOWMAN     2,669,639
METHOD AND APPARATUS FOR THE PRODUCTION OF WELDED TUBING
Filed Feb. 29, 1952     4 Sheets-Sheet 2

INVENTOR.
HOWARD J. BOWMAN.
BY
*Ward Crosby & Neal.*
ATTORNEYS.

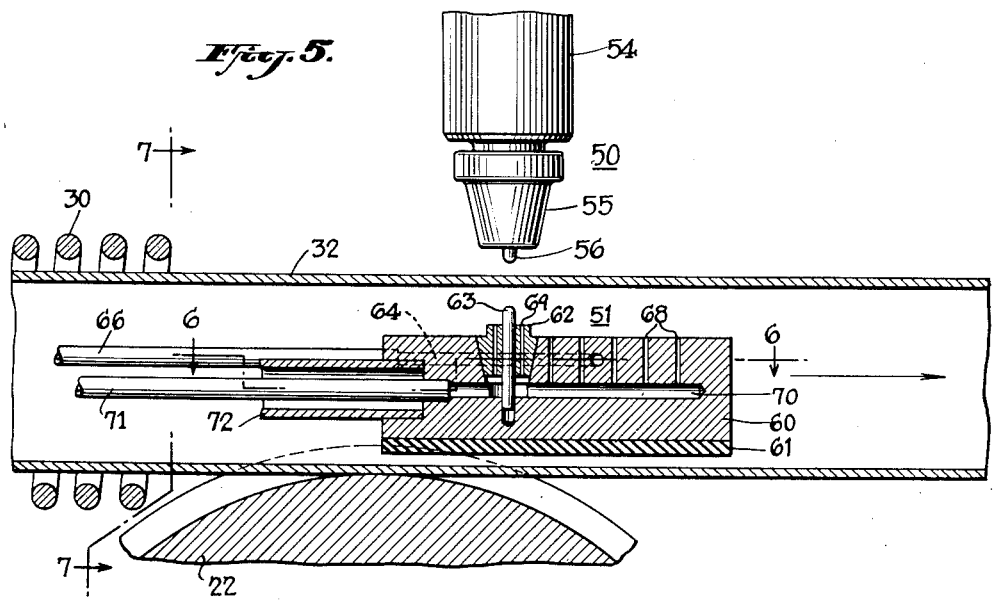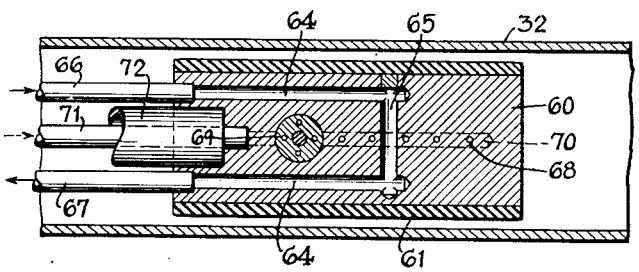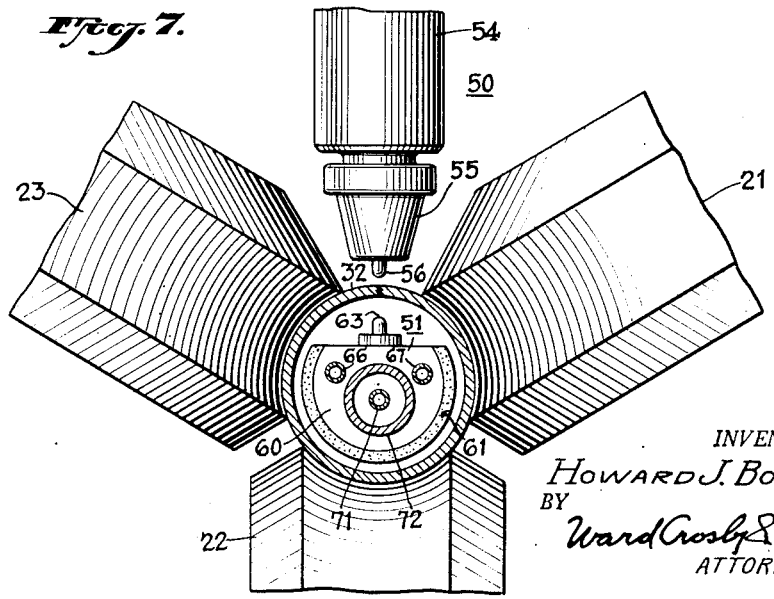

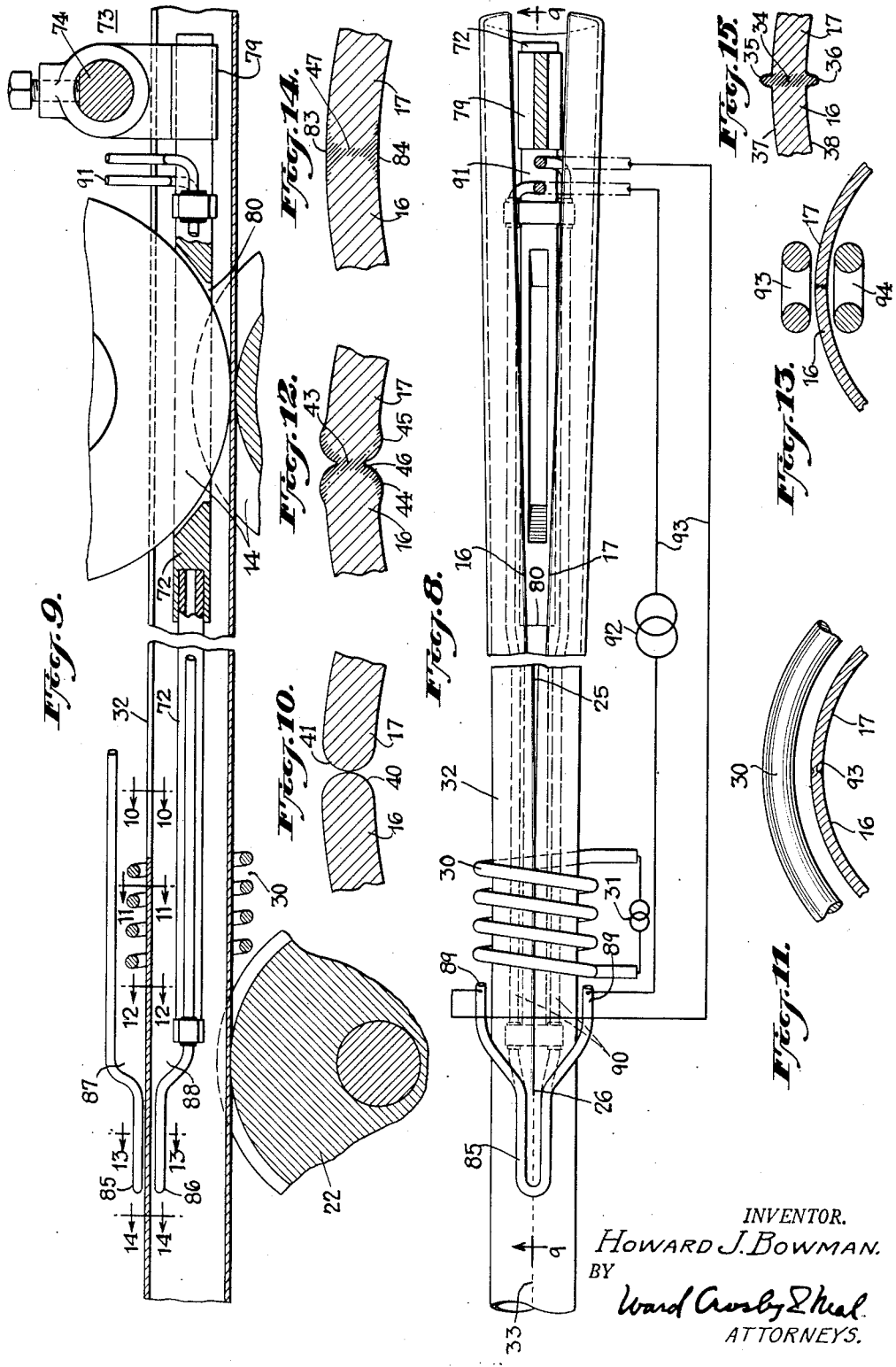

Patented Feb. 16, 1954

2,669,639

UNITED STATES PATENT OFFICE 2,669,639

METHOD AND APPARATUS FOR THE PRODUCTION OF WELDED TUBING

Howard J. Bowman, East Troy, Wis., assignor to Trent Tube Company, East Troy, Wis., a corporation of Wisconsin Application February 29, 1952, Serial No. 274,249

12 Claims. (Cl. 219—6)

1

This invention pertains to improvements in methods and apparatus for the production of welded seam tubing.

An objection of the invention is to provide a method and apparatus employing high frequency induction heating, supplemented by further heating by high frequency induction or by electric arcs, for the high speed production of welded seam tubing, in which the weld joint is formed substantially flush with both the inside and outside diameters of the tubing.

Although the invention is applicable to the production of spirally wound tubing having a welded seam, it is applied in accordance with the preferred embodiments herein, to the production of tubing having a longitudinally extending welded seam.

Tubing of this character having a sound weld joint which is formed substantially flush with the tube inside and outside diameters, is being successfully produced by means of contactual, inert-gas-shielded arcs, but the rate of production is necessarily rather slow, i. e., about two feet per minute.

A much higher production rate can be attained by resort to high frequency induction welding, for example, by passing the tubing just as it enters the final squeeze rolls, through an induction coil energized from a high frequency current source, thus to induction heat to plasticity the opposed edges of the metal strip from which the tubing is formed, whereby upon passing thence through the final squeeze rolls, the edges are pressed into welding engagement. Tubing formed in this way can be produced at the rate of about 40 to 70 feet per minute. However, it is subject to a serious shortcoming, namely, that the weld joint is formed with raised "flash" or upset portions which project beyond the tubing walls along the seam on both the inside and outside diameters of the tubing.

It is proposed in accordance with the present invention to eliminate this flash as well as to prevent its formation by supplementing the aforesaid high frequency induction coil disposed on the entry side of the final squeeze rolls, with either a pair of arcs disposed on the delivery side of said rolls along the weld seams, both interiorly and exteriorly of the tubing, respectively, or by employing in their stead, a pair of high frequency, induction focusing coils.

In accordance with one modification of the invention these arcs or focusing coils may be employed to puddle or flow the flash or upset along the seam both interiorly and exteriorly of the

2 tubing and thus provide a weld joint which is substantially flush with the interior and exterior tube diameters.

In accordance with a preferred modification, however, formation of the flash is prevented and a smooth weld joint obtained both exteriorly and interiorly of the tubing, by initially imparting a rounded or arcuate sectional contour to the lateral edges of the metal strip from which the tubing is formed, and by adjusting the pressure in the final squeeze to such value that only the midsection of the opposed strip edges are pressed into welding engagement following induction heating, whereas the upper and lower portions of the rounded edges are merely upset sufficiently to provide metal to fill in the resulting interposed inner and outer welding seam crevices, upon flowing the metal in passing between the arcs or focusing coils on the delivery side of the squeeze rolls. In this way a weld joint is obtained which is substantially I-shaped in cross section and the upper and lower edges of which are substantially flush with both the internal and external tube diameters.

Figure 4:
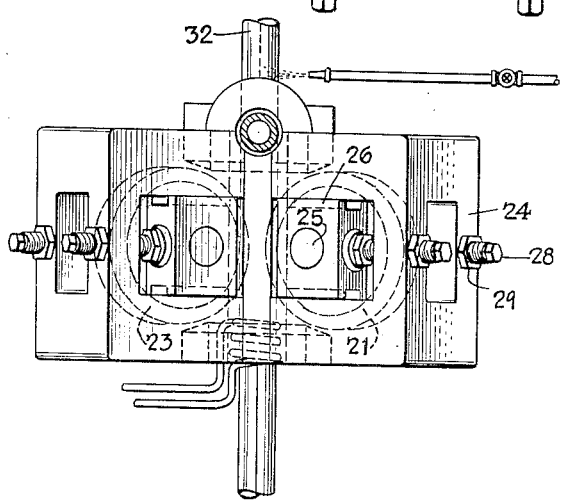

Having thus described the invention in general terms, reference will now be had to the accompanying drawings for a more detailed description, wherein:

Figs. 1 to 7, inclusive, illustrate the modification in which high frequency induction heating is employed in the entry side of the final squeeze rolls in conjunction with electrical arcs on the delivery side, for providing a weld free from internal or external flash, Fig. 1 and Fig. 1a being a side elevation of the essential apparatus components including the forming rolls together with the induction and arc heating or welding units, while Fig. 2 is a plan view thereof. Fig. 3 is an elevation taken at 3—3 of Fig. 1 to illustrate the positioning of the final forming or squeeze rolls and the yoke mounting the same in relation to the induction coil. Fig. 4 is a plan view of the yoke shown in elevation in Fig. 3. Fig. 5 is an axial sectional elevation through the arc welding assembly shown in elevation at the extreme left in Fig. 1; while Figs. 6 and 7 are sectional details thereof taken, respectively, at 6—6 and 7—7 of Fig. 5.

Figs. 8 and 9 sufficiently illustrate in conjunction with Figs. 1-7, inclusive, the second modification of the invention wherein the arc welding units are replaced by high frequency focusing coils, Fig. 8 being a plan view and Fig. 9 a longitudinal sectional elevation at 9—9 of Fig. 8.

Figs. 10 to 14, inclusive, are enlarged fragmentary, sectional showings taken at 10—10 to 14—14, respectively, of Fig. 9, illustrative of the aforesaid preferred method of forming the weld seam, while Fig. 15 is a similar fragmentary showing of the method wherein the weld is initially formed with a "flash" which is then puddled by the arcs or focusing coils.

Referring to the drawings, and more particularly for the moment to Figs. 1 to 7, inclusive, the initially flat metal strip 10 to be converted into tubing is fed through a guide 10a, and thence between successive pairs of forming rolls 11 to 15, inclusive, mounted on roll stands, as at 16a to 16c, whereby the strip is progressively formed into tubular configuration in the manner shown in Figs. 1 and 2 and on an enlarged scale in Figs. 8 and 9. The final roll pair 15 does not bring the opposed strip ends 16, 17 into abutment, this being accomplished by a succeeding roll stand 16d in which a series of three squeeze rolls, 21, 22, 23 are rotatably mounted at equal angles of 120° to each other in a yoke 24, as shown most clearly in Fig. 3. The roll shafts, as at 25, are journaled to bearing blocks, as at 26, 27, which are slidable in guideways of the yoke 24 and are adjustable by means of threaded bolts and lock nuts, as at 28, 29, for adjusting and centering the tube aperture formed by the rolls. Referring to Figs. 8 and 9, it will be noted that in passing from roll pair 14 to the final squeeze rolls 21–23, inclusive, the opposed strip edges 16, 17 converge along a V notch to a junction point of abutment 26 beneath the squeeze rolls. For welding purposes, it is important to have a uniform V notch just ahead of these squeeze rolls. To assure this, referring to Figs. 1 and 2, a sapphire wedge 29a is inserted in the V notch a short distance, i. e., about 6 inches, in advance of the junction point 26. This wedge may be mounted in any convenient manner, such for example, as on a bracket 29b, bolted to the roll stand 16c, as at 29c.

Mounted on the entry side of the squeeze roll stand 16d by conventional means not shown, is a high frequency induction coil 30, energizable from a source of high frequency current, as shown diagrammatically at 31. The frequency of the source may be about 125 to 1800 kc. but is preferably about 375 to 475 kc. The tubular stock 32 is fed from the last roll pair 15 to the final roll stand 16d, axially through coil 30, whereby the high frequency current flowing therein induces, by transformer action, a secondary current in tubing 32, which flows circumferentially therein substantially within the axial limits of coil 30. The induced secondary current thus flows transversely across the slight air gap between the opposed strip edges 16, 17 to concentrate the heat dissipation of the secondary current along the strip edges, whereby the edges are preferentially and rapidly heated to plasticity, i. e., to a temperature of about 2200 to 2400° F. and without unduly heating the remaining or body portion of the tubing.

Accordingly, as the tubing is fed progressively through the induction coil 30 and thence through the final roll stand 16d, the opposed strip edges are progressively heated to plasticity by coil 30 and thereupon brought immediately into welding abutment by the squeeze rolls 21 to 23, inclusive, to form a continuous weld seam, as indicated at 33.

If the strip edges are initially cut at right angles to the face of the strip in the conventional manner, the induction weld so produced will be as shown in the fragmentary sectional view of Fig. 15, in which the opposed strip edges are designated, as before, at 16 and 17, and the weld joint at 34. The weld joint so produced results in "flash" or upset portions projecting as at 35, 36, beyond the exterior and interior surfaces 37, 38 of the tubing proper.

While this "flash" may be removed by means of the above mentioned auxiliary heating or welding units described in detail below, in my preferred method of induction welding, the strip from which the tubing is formed is initially provided with rounded or arcuately contoured edges, as at 40, 41 of Fig. 10. With strip of this configuration, the opposed strip edges are, as before, heated to plasticity in passing through the induction coil 30, and are thereupon brought together with sufficient pressure in the squeeze rolls 21 to 23, inclusive, to form a weld joint as shown at 43 of Fig. 12, wherein only the midsections of the opposed strip edges are welded, while the remaining portions of the arcuate edges 40, 41, are slightly upset, as at 44, 45, by the pressure of the squeeze rolls. The upset portions remain separated by longitudinal crevices, as at 46, whereby in the ensuing flowing operation produced by the arcs or focusing coils as discussed below, the upset portions 44, 45, flow into the crevices 46, and thus produce a final weld joint, as at 47, which is substantially flush with the interior and exterior surfaces of the tubing.

Reverting now to Figs. 1 to 7, inclusive, the tubing upon passing between the squeeze rolls 21 to 23, inclusive, passes thence between a pair of arc welding units indicated generally at 51, 50, mounted, respectively, interiorly and exteriorly of the tubing along the weld seam, in the vertically opposed relation most clearly shown in Figs. 1, 3 and 5. These units are preferably of contactual, inert-gas-shielded arc type, employing non-consumable electrodes. The external arc welding unit is of more or less conventional construction for producing an inert-gas-shielded arc, and hence requires little detailed description. It comprises in its essentials a vertical support 52, on which is mounted an offset arm 53, on which in turn is vertically mounted a hollow electrode holder 54, terminating in a nozzle 55, for directing about an axially mounted, non-consumable electrode 56, of thoriated tungsten or like, a shielding blanket or atmosphere of an inert gas, such as argon or helium.

The arc welding unit 51 which is disposed interiorly of the tubing 32, comprises a metal electrode holder 60 of semi-cylindrical configuration, Figs. 5–7, inclusive, the cylindrical portion of which is encased in an insulating shell 61, and the upper portion of which is drilled for reception of a collet 62, in an axial bore of which the electrode 63 is mounted.

Member 60 is provided with connecting passageways, as at 64, 65, for circulation of a coolant, such as cold water, supplied over inlet and outlet pipelines 66, 67. Member 60 is also provided with a series of gas outlets, as at 68, 69, connecting to a supply passage 70, for supplying to the arc an atmosphere of an inert gas, which is furnished over a gas pipeline 71 connected to passageway 70.

The entire unit 51 is mounted upon a supporting arm 72, which extends back to a point between the roll pairs 13 and 14, at which the converging strip edges 16 and 17 are spaced sufficiently far apart, to permit of the insertion of a cantilever mounting 73 therefor. This mounting comprises a transversely extending stud shaft 74 bolted at its ends to the roll housing 16b, as at 75, 76, and having slidably mounted thereon a bracket 77 held by a clamping bolt 78. The bracket has formed in its lower end, a sleeve 79 through which the supporting arm 72 extends, as shown in Figs. 8 and 9, and to which sleeve arm 72 is secured by welding or otherwise. Arm 72 is longitudinally slotted, as at 80, Figs. 8 and 9, to provide space for projection of the upper roll of pair 14 therethrough and against the tubing being formed, in the manner most clearly shown in Figs. 9 and 1. The water and gas lines 66, 67, 71 extend back along the tubing 32 and find outlet at 81 via a supporting bracket 82.

The arc welding units 50, 51 serve to puddle and remove the flash 35, 36 from induction welded tubing produced in the manner described and connecting with Fig. 15 above. On the other hand, and with reference to the arc welding procedure described in connection with Figs. 10 to 14, inclusive, the arc welding units serve to flow the upset portions 44, 45, into the crevice 46, to produce a final weld joint as shown at 47, Fig. 14, of substantially I shape in cross section, the exposed surfaces 83, 84 of which are substantially flush with the interior and exterior surfaces of the tubing proper.

In the Figs. 8 and 9 modification, these same results are achieved by substitution of high frequency focusing coils 85, 86 for the arc welding units 50, 51. These coils are preferably of narrow hairpin like configuration and are disposed along the weld seam as shown, for concentrating their high frequency induction heating fields along the seam, the conductor spacings being thence increased and bent away from the tubing 32, as at 87 to 90, inclusive, to this same end. The conductors extending from coil 86 within the tubing 32, find outlet between the strip edges 16, 17 as at 91, between the roll pairs 13 and 14. These coils are preferably energized in series from a high frequency source 92 over conductors 93. The high frequency source 92 may be the same as or different from source 31.

Referring to Fig. 1, the roll pair 95 at the left comprises a pair of driven pull rolls for continuously feeding the strip and tubing through the forming roll.

What is claimed is:

1. The method of producing welded tubing from elongated metal strip, which comprises: forming said strip into tubular configuration with the opposite edges of said strip opposed, progressively subjecting said edges to a higher frequency electrical field to induction heat said edges to plasticity, and thereupon pressing said edges together in a weld joint, and, after the edges have been pressed together and the joint has been formed, subjecting said weld joint and the metal adjacent thereto to further heating both interiorly and exteriorly of said tubing until the metal adjacent said joint flows and forms a continuous joint which is substantially flush with the interior and exterior surfaces of said tubing.

2. The method of producing welded tubing from elongated metal strip, which comprises: forming said strip into tubular configuration with the opposite edges of said strip opposed but spaced apart to form a gap, progressively subjecting said edges to a high frequency electrical field to heat said edges to plasticity by induced current flow across said gap and thereupon bringing said edges together with welding pressure, and, after the edges have been pressed together and the joint has been formed, subjecting said edges and the metal adjacent thereto to further localized heating both interiorly and exteriorly of said tubing, until the metal adjacent said joint flows and forms a continuous joint which is substantially flush with the interior and exterior surfaces of said tubing.

3. The method of producing welded tubing from elongated metal strip, which comprises: continuously forming said strip into tubular configuration with the opposite edges of said strip converging to a junction, progressively subjecting said edges adjacent said junction, to a high frequency electrical field by induced current flow across the converging gap between said edges to heat said edges to welding temperature, and thereupon bringing said edges together with welding pressure at said junction to form a joint, and, after the edges have been pressed together and the joint has been formed, flowing the metal along said edges by further heating, both interiorly and exteriorly of said tubing, until the metal adjacent said joint flows and forms a continuous joint which is substantially flush with the interior and exterior surfaces of said tubing.

4. The method of producing welded tubing from metal strip, which comprises: continuously feeding said strip in the direction of its length while progressively shaping the same into tubular configuration until the opposite edges converge to a junction to form a continuous seam, subjecting said edges substantially at said junction to high frequency induction heating to heat said edges to welding temperature, while pressing said edges together to form a joint, and at a point spaced therefrom in the direction of feed, subjecting said edges and the metal adjacent thereto to further localized heating both interiorly and exteriorly of said tubing, until the metal adjacent said joint flows and forms a continuous joint which is substantially flush with the interior and exterior surfaces of said tubing.

5. The method of producing welded tubing from metal strip, which comprises: continuously feeding said strip in the direction of its length while progressively shaping the same into tubular configuration until the opposite edges converge to abutment at a junction point to form a continuous seam, subjecting said edges substantially at said junction to high frequency induction heating to heat said edges to welding temperature while pressing said edges together at said junction to form a joint, and, at a point spaced therefrom in the direction of feed, subjecting said edges and the metal adjacent thereto to further localized high frequency induction heating both interiorly and exteriorly of said tubing, until the metal adjacent said joint flows and forms a continuous joint which is substantially flush with the interior and exterior surfaces of said tubing.

6. The method of producing welded tubing from metal strip, which comprises: continuously feeding said strip in the direction of its length while progressively shaping the same into tubular configuration until the opposite edges converge to abutment at a junction to form a continuous seam, subjecting said edges substantially at said junction to high frequency induction heating to heat said edges to welding temperature while pressing said edges together at said junction to form a joint, and, at a point spaced therefrom in the direction of feed, subjecting said edges and the metal adjacent thereto to further localized heating with electrical arcs disposed both interiorly and exteriorly of said tubing, until the metal adjacent said joint flows and forms a continuous joint which is substantially flush with the interior and exterior surfaces of said tubing.

7. A method for producing welded tubing from metal strip having rounded edges in transverse section, said method comprising: continuously feeding said strip in the direction of its length while progressively shaping the same into tubular configuration until the opposed strip edges converge to a junction to form a continuous seam; heating said strip edges adjacent said junction to welding temperature by induced high frequency currents, and thereupon pressing said edges sufficiently together at said junction to weld the midsections thereof while slightly upsetting the remaining edge portions so as to form upset portions on opposite sides of said midsections, said portions being separated by a crevice, and thereupon flowing said upset edge metal into said crevice by further heating interiorly and exteriorly of said tubing until a weld joint is formed which is substantially flush with the internal and external surfaces of said tubing.

8. Apparatus for producing welded tubing from elongated metal strip, comprising: a series of forming rolls and final squeeze rolls together with means mounting the same in tandem for progressively forming said strip into tubular configuration until the opposed edges thereof converge into abutment in said squeeze rolls, thereby to form tubing having a continuous seam; means for progressively feeding said strip through said rolls; a high frequency induction heating coil and means mounting the same for axial traverse by said tubing substantially at the entry to said squeeze rolls; a pair of additional heating units and means mounting the same, respectively, interiorly and exteriorly of said tubing along said seam on the delivery side of said squeeze rolls.

9. Apparatus for producing welded tubing from elongated metal strip, comprising: a series of forming rolls and final squeeze rolls together with means mounting the same in tandem for progressively forming said strip into tubular configuration until the opposed edges thereof converge into abutment in said squeeze rolls, thereby to form tubing having a continuous seam; means for progressively feeding said strip through said rolls; a high frequency induction heating coil and means mounting the same for axial traverse by said tubing substantially at the entry to said squeeze rolls; a pair of high frequency induction focusing coils and means mounting the same, respectively, interiorly and exteriorly of said tubing along said seam on the delivery side of said squeeze rolls.

10. Apparatus for producing welded tubing from elongated metal strip, comprising: a series of forming rolls and final squeeze rolls together with means mounting the same in tandem for progressively forming said strip into tubular configuration until the opposed edges thereof converge into abutment in said squeeze rolls, thereby to form tubing having a continuous seam; means for progressively feeding said strip through said rolls; a high frequency induction heating coil and means mounting the same for axial traverse by said tubing substantially at the entry to said squeeze rolls; a pair of arc welding units and means mounting the same, respectively, interiorly and exteriorly of said tubing along said seam on the delivery side of said squeeze rolls.

11. Apparatus for producing welded tubing from elongated metal strip, comprising: a series of forming rolls and final squeeze rolls together with means mounting the same in tandem for progressively forming said strip into tubular configuration until the opposed edges thereof converge into abutment in said squeeze rolls, thereby to form tubing having a continuous seam; means for progressively feeding said strip through said rolls; a high frequency induction heating coil and means mounting the same for axial traverse by said tubing substantially at the entry to said squeeze rolls; a pair of arc welding units, having non-consumable electrodes and means mounting the same, respectively, interiorly and exteriorly of said tubing along said seam on the delivery side of said squeeze rolls, and means for blanketing the arcs of said welding units with an atmosphere of an inert gas.

12. Apparatus for producing welded tubing from elongated metal strip, comprising: a series of forming rolls and final squeeze rolls together with means for mounting the same in tandem for progressively forming said strip into tubular configuration until the opposed edges thereof converge into abutment in said squeeze rolls, thereby to form tubing having a continuous longitudinal seam; means for progressively feeding said strip through said rolls; a high frequency induction heating coil, and means mounting the same for axial traverse by said tubing substantially at the entry to said squeeze rolls, thereby to heat said strip edges to a welding temperature prior to the exertion of welding pressure thereon by said squeeze rolls; a pair of additional electrical heating units and means mounting the same, respectively, interiorly and exteriorly of said tubing along said seam on the delivery side of said squeeze rolls, said additional heating units being adapted to flow the metal along said seam to provide a weld joint which is substantially flush with the interior and exterior surfaces of said tubing.

HOWARD J. BOWMAN.

References Cited in the file of this patent

UNITED STATES PATENTS

| Number | Name | Date |
|---|---|---|
| 1,354,593 | Belmont | Oct. 5, 1920 |
| 1,467,792 | Holmes | Sept. 11, 1923 |
| 2,205,425 | Leonard, Jr. | June 25, 1940 |
| 2,209,637 | Sessions | July 30, 1940 |
| 2,496,188 | Wiese | Jan. 31, 1950 |

FOREIGN PATENTS

| Number | Country | Date |
|---|---|---|
| 616,117 | Great Britain | Jan. 17, 1949 |